United States Patent [19]
Fukuzawa et al.

[11] Patent Number: 5,760,930
[45] Date of Patent: Jun. 2, 1998

[54] ELECTROPHOTOGRAPHIC IMAGE FORMING APPARATUS WITH DENSITY REGULATING MECHANISM

[75] Inventors: Nobumasa Fukuzawa; Tsuyoshi Kunishi, both of Yokohama; Hiroyuki Ichikawa, Kawasaki, all of Japan

[73] Assignee: Canon Kabushiki Kaisha, Tokyo, Japan

[21] Appl. No.: 465,911

[22] Filed: Jun. 6, 1995

Related U.S. Application Data

[63] Continuation of Ser. No. 66,205, May 25, 1993, abandoned.

[30] Foreign Application Priority Data

May 28, 1992 [JP] Japan ................. 4-164329

[51] Int. Cl.⁶ ......................................... H04N 1/60
[52] U.S. Cl. ..................... 358/521; 358/529; 347/172
[58] Field of Search ......................... 358/501, 515, 358/516, 518, 520, 532; 347/172, 173, 183, 184, 188, 191; 382/167; H04N 1/60

[56] References Cited

U.S. PATENT DOCUMENTS

| | | | |
|---|---|---|---|
| 4,864,392 | 9/1989 | Sato | 358/80 |
| 4,977,448 | 12/1990 | Murata et al. | 358/75 |
| 4,982,277 | 1/1991 | Katoh et al. | 358/80 |
| 5,018,008 | 5/1991 | Asada | 358/518 |
| 5,113,252 | 5/1992 | Horie et al. | 358/77 |
| 5,155,587 | 10/1992 | Itoh | 358/79 |
| 5,172,223 | 12/1992 | Suzuki | 358/79 |
| 5,181,068 | 1/1993 | Morikawa | 355/77 |
| 5,237,400 | 8/1993 | Washio et al. | 358/518 |
| 5,241,396 | 8/1993 | Harrington | 358/296 |
| 5,344,732 | 9/1994 | Chiba | 430/42 |
| 5,392,139 | 2/1995 | Murata | 358/518 |

FOREIGN PATENT DOCUMENTS 57-178474  11/1982  Japan.

Primary Examiner—Kim Yen Vu
Attorney, Agent, or Firm—Fitzpatrick, Cella, Harper & Scinto

[57] ABSTRACT

An image forming apparatus which varies the blending ratio by which color-seperated image signals are blended together to form a monochromatic image. The apparatus inputs a plurality of image signals which have been color-separated, and synthesizes the plurality of image signals by blending to form a monochromatic image. A density regulating mechanism regulates the density of the monochromatic image to a predetermined density level, and the apparatus varies the blending ratio of the synthesized plurality of image signals based on the predetermined density level.

6 Claims, 2 Drawing Sheets

ELECTROPHOTOGRAPHIC IMAGE FORMING APPARATUS WITH DENSITY REGULATING MECHANISM

This application is a continuation, of application Ser. No. 08/066,205 filed May 25, 1993, now abandoned.

BACKGROUND OF THE INVENTION

1. Field of the Invention

The present invention relates to an image forming apparatus equipped with an image reading device for reading the color information of an original image by a solid-state image pickup device such as a CCD.

2. Related Background Art

There is already known a digital copying machine capable of reading the color information of the original image as color-separated digital signals by a CCD or the like. In such digital copying machine, the color information of the original image is separated into colors such as R (red), G (green) and B (blue) which are released as respective digital signals, and a black-and-white (Bk) signal, corresponding to the black color in the original image, is synthesized from these digital signals of three colors. Thus the Bk signal is formed by synthesizing the color-separated R, G and B signals, for example by arithmetic mean (Bk=(R+G+B)/3).

The black (Bk) image signal may also be obtained by other methods. The separation of the original image into R, G and B colors and the simple synthesis thereof may result in a deterioration of the black image, such as color shift. For this reason, the black (Bk) image signal may be obtained from a color signal only, for example the G signal.

However, when the black (Bk) image signal is synthesized from the R, G and B signals or obtained from a specified color signal only, such as the G signal, as in the prior art explained above, the resulting printed image may involve following drawbacks.

For example, there are encountered cases in which the printout is made with the black color only in a digital copying machine in order to reduce the copying cost or to increase the copying speed, or in which a digital copying machine is designed only for the printout with the black color only though the color separation is executed in the image reading device in order to achieve additional functions for the colored originals such as the identification of a marker. In either case, though an original image containing the black image only can be copied without problem, an original containing colored information may result in a defect in the density of the obtained black-and-white copy.

For example, when a sectioned paper printed with blue color, with a spectral reflectance as shown in FIG. 3 is copied in the black-and-white color, it is difficult to obtain such blue-printed sections on the copy in the ordinary copy density, if the black (Bk) signal is obtained as Bk=(R+G+B)/3 or Bk=G as explained above, because the levels of B and G signals are high and not too much different from the reflectance from the white background. The density of the output image of such blue-colored sections will still be very low, even if the density level is selected highest within the ordinary density control range provided in the digital copying machine.

In these cases, the absence of the image of blue-colored sections in the copying operation with the ordinary copy density may not be considered as a serious defect, but such absence of image even when the density control function provided in the apparatus is utilized is considered as a major drawback, because the image of such blue-colored sections cannot be obtained even when it is desired.

On the other hand, the density control mode of the apparatus is so adjusted as to copy the blue-colored sections with a copy density of 0.5 to 1.0 in order to avoid the above-mentioned drawback, the white background of the original image which should appear as white on the copy will have a density of 0.3 to 0.7, whereby the copy becomes grayish over the entire area. Also if the R component is enhanced in the Bk signal, a red-colored area in the original image is copied with a very low density at the ordinary copy density.

SUMMARY OF THE INVENTION

An object of the present invention is to resolve the above-mentioned drawbacks in the prior art.

Another object of the present invention is to provide an image forming apparatus capable of reproducing the image of a specified color with an increased or decreased density.

The above-mentioned objects can be attained, according to the present invention, by an electrophotographic image forming apparatus provided with a density regulating mechanism, comprising reader means for reading the image information of an original image with color separation and generating electrical signals; synthesizing means for synthesizing thus obtained color-separated signals thereby providing a monochromatic image; density regulating means for regulating the density of the output image released by said synthesizing means; and image forming means for varying the image forming conditions of the apparatus according to density information released from said density regulating means, wherein said density regulating means is adapted to vary, in the output density information, the blending ratio of the color-separated signals read by said reader means, according to a selected density level.

DESCRIPTION OF THE PREFERRED EMBODIMENTS

Now the present invention will be clarified in detail by an embodiment thereof shown in the attached drawings.

[Embodiment 1]

Figure 2:
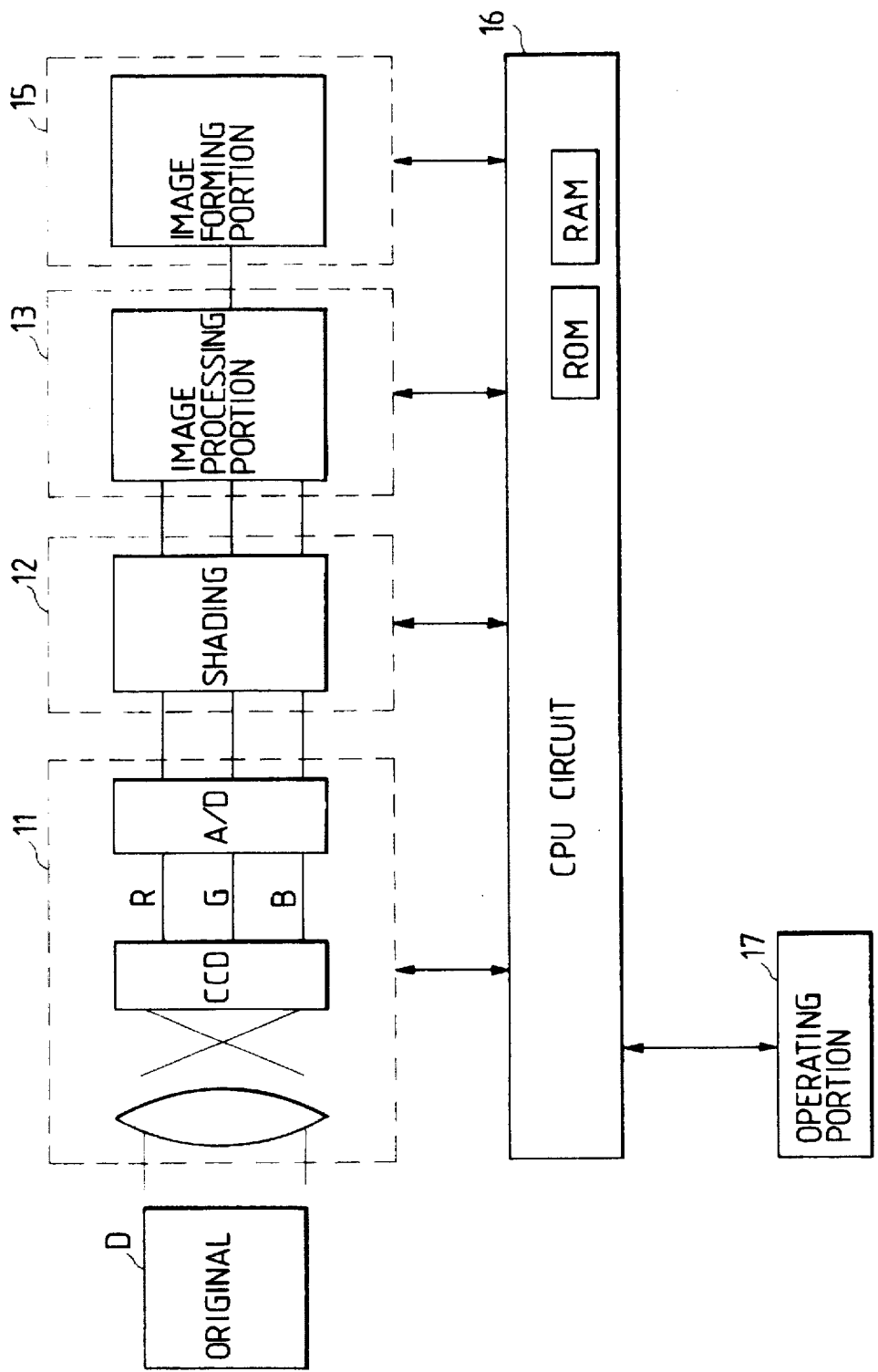
FIG. 2 is a block diagram showing the configuration of the entire image forming apparatus.

At first referring to FIG. 2, the image forming apparatus is provided with an image reader unit 11, a shading correction unit 12, an image processing unit 13, an image recording unit 15, a CPU circuit unit 16, an operation unit (density regulating unit) 17 etc. The color information of an original D is separated by a CCD in the image reader unit 11 into R, G and B colors, which are subjected to A/D conversion to generate digital signals. Subsequently there are conducted a shading correction, and, in the image processing unit 13, a density processing, including a step for generating a monochromatic signal to be explained later.

Based on the signal generated in said image processing unit 13, the image forming unit 15 effects image formation, utilizing a conventional electrophotographic process. The processing steps are linked with the CPU circuit unit 16, with suitable signal exchange. A density regulating mechanism to be explained later is included in the operation unit 17, and is therefore linked with the image processing unit 13 through the CPU circuit unit 16.

Figure 1:
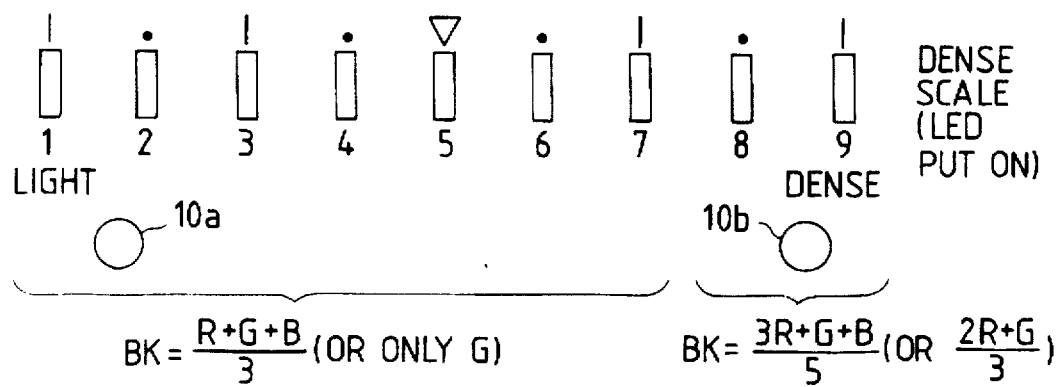
FIG. 1 is a schematic plan view of an operation unit (density regulating mechanism)
Figure 3:
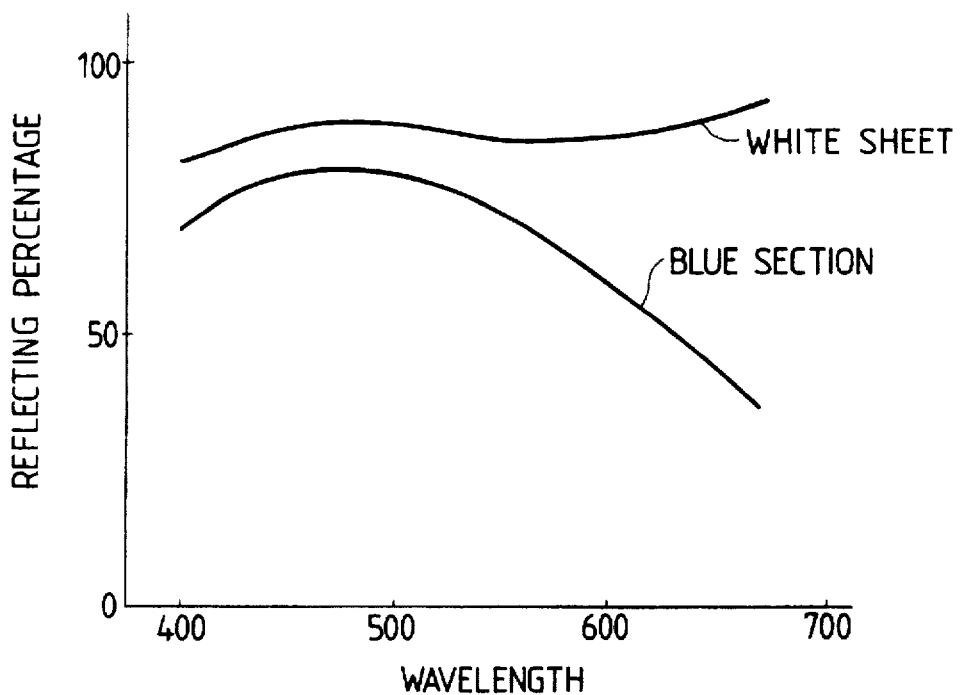
FIG. 3 is a chart showing the spectral reflectance.

The density regulating mechanism of the operation unit 17, shown in FIG. 1, is provided with a density scale of nine levels, numbered from 1 to 9 from lower to higher copy density. For example, when a level "5" is indicated by an LED, the density level moves to a lower or higher density by the depression of a copy density selection key 10a or 10b, respectively. The density level of the copied image is determined either by the depression of the copy density selection key 10a or 10b by the user according to the original image, or automatically by the AE (automatic exposure) function.

In the present invention, the black signal is obtained, in the levels 1 to 7, by a synthesis $Bk=(R+G+B)/3$, and, in the levels 8 and 9, by a synthesis $Bk=(3R+G+B)/5$. Thus, in said levels 8 and 9, the blue-colored sectioned paper can be copied with a density enough for observation (D=ca. 1.0), without generating fog or smudge in the white background area.

Also in case the black signal is formed by Bk=G only, the copy density of the blue-colored sections can be secured by employing $Bk=(2R+G)/3$.

In practice the image signals flow as shown in FIG. 2, and, according to the present invention, the image processing unit 13 varies the blending ratio of the R, G and B signals through the CPU circuit unit 16 according to the density level instructed by the operation unit 17, and the black (Bk) signal thus obtained is supplied to the image forming unit.

In the foregoing embodiment, there has been explained the measure, for the blue-colored sectioned paper, but, in more general terms the present invention is featured by varying the blending ratio of the R, G and B signals in the black image according to the level of density regulation.

[Embodiment 2]

When the density is regulated to a higher level, contrary to the foregoing embodiment, the reddish colors can be enhanced by increasing the proportion of the B signal.

[Embodiment 3]

When the density is regulated to a lower level, it is also possible to erase blue or red color by decreasing the proportion of blending of R and G signals or G and B signals, respectively.

[Embodiment 4]

The foregoing embodiments employ a reader system for separating the color information of the original into R, G and B colors. However, also in a digital copying machine which recognizes the color of the original for example with two colors such as C (cyan) and R (red) colors, it is possible to emphasize, for example, the blue-colored sections by varying the blending ratio of C and R colors.

As explained in the foregoing, in case of producing a copy with black color only from an original with a digital copying machine, it is possible to increase or decrease the copy density of an arbitrary color in the original by means of the density regulating mechanism which is designed to provide appropriate copy densities in the standard mode, by varying the blending ratio of the color-separated signals, in synthesizing the black image signal, according to the level of the copy density.

The image forming unit 15 shown in FIG. 2 is provided, as already known, with an electrophotographic photosensitive member, corona discharge means for uniformly charging said photosensitive member, optical means for exposing thus charged photosensitive member to optical information thereby forming a latent image thereon, developing means for developing said latent image at least with black toner, transfer means for transferring a toner image, obtained by said development, onto a transfer material, and fixing means for heat fixing the toner image on said transfer material, but more detailed explanation will be omitted.

What is claimed is:

1. A copying system, comprising:

color separating means for color-separating an original image into a plurality of color signals;

combining means for combining the plurality of color signals color-separated by said color separating means according to a predetermined ratio;

monochromatic image forming means for forming a monochromatic image of the original image on a recording medium, the monochromatic image having a density which corresponds to the predetermined ratio of the plurality of color signals combined by said combining means; and ratio changing means for changing the predetermined ratio.

2. A copying system according to claim 1, wherein said color separating means separates the plurality of color signals into a red signal, a green signal and a blue signal.

3. A copying system according to claim 2, wherein said ratio changing means changes a ratio of the red signal with respect to at least one of the green signal and the blue signal.

4. A copying system according to claim 1, wherein the monochromatic image is black.

5. A copying system according to claim 1, wherein said ratio changing means changes the predetermined ratio to change a density of blue color in the original image.

6. A copying system comprising:

color separating means for color-separating an original image into a plurality of color signals;

combining means for combining the plurality of color signals color-separated by said color separating means according to a predetermined ratio;

monochromatic image forming means for forming a monochromatic image of the original image on a recording medium, the monochromatic image having a density which is derived from the plurality of color signals combined by said combining means;

ratio changing means for changing the predetermined ratio; and density adjusting means, manually operable by an operator, for adjusting a density of the monochromatic image;

wherein the ratio changing means changes the predetermined ratio according to a density set by said density adjusting means.

* * * * *